Patented Aug. 10, 1937

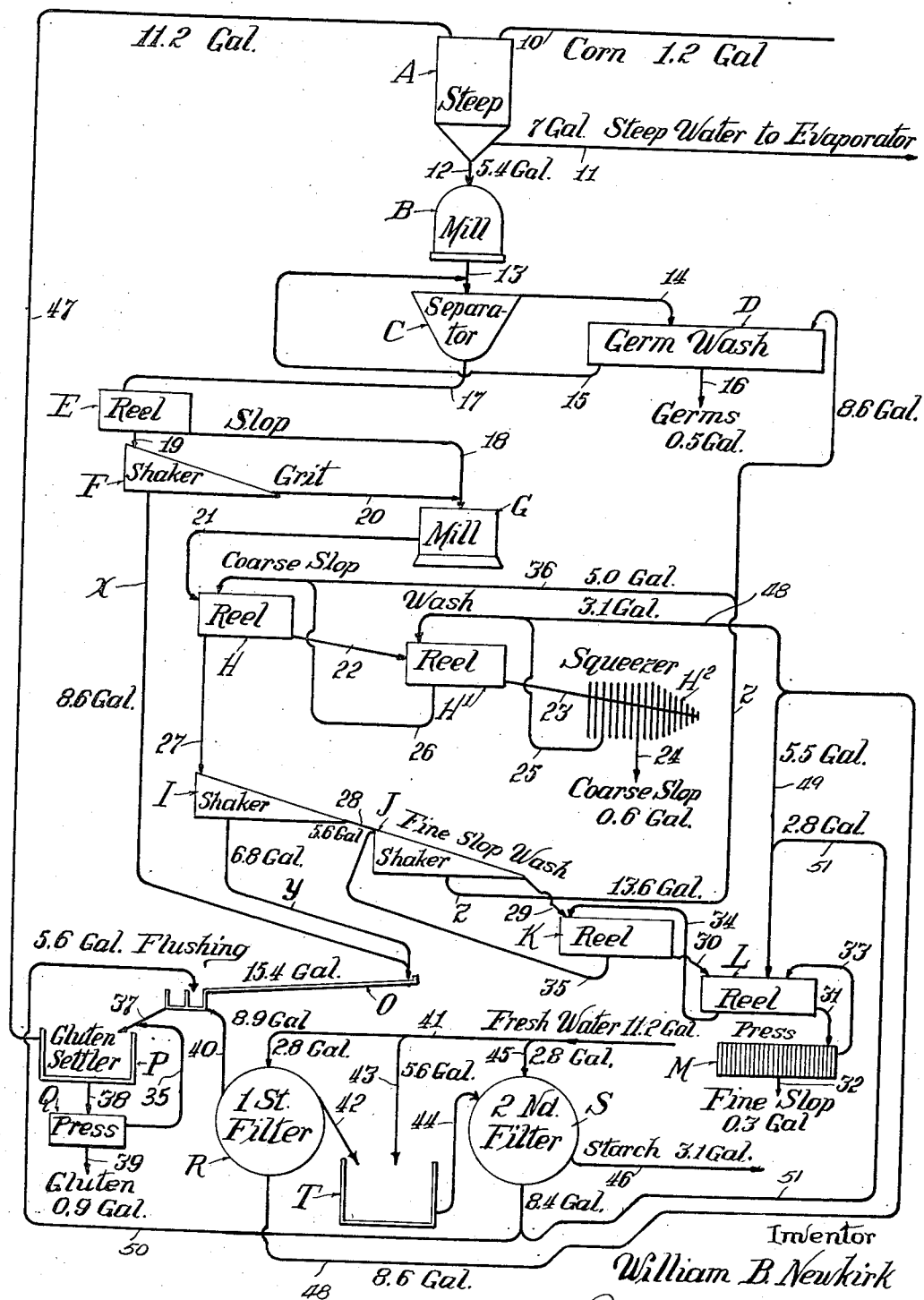

2,089,404

UNITED STATES PATENT OFFICE 2,089,404

WET STARCH SYSTEM

William B. Newkirk, Western Springs, Ill., assignor to International Patents Development Company, Wilmington, Del., a corporation of Delaware Application October 17, 1934, Serial No. 748,638

3 Claims. (Cl. 127—65)

This invention relates to the manufacture of starch from corn by the "wet method" in which, according to common practice, the corn after being steeped in water containing sulphur dioxide, is subjected to separating operations in water for removal of the germ, bran, or hull and fiber; the process at this stage (wet starch system) being divided, commonly, into three operations called germ, coarse slop and fine slop separations, after which the resultant mixtures of starch, gluten and water, referred to herein as starch milk streams, are combined and run through shallow, slightly inclined troughs, (starch tables) for separation of the gluten and the bulk of the water from the starch, the starch remaining on the tables and the gluten and water tailing off therefrom. This tabling operation is followed, ordinarily, by settling the gluten out of the table effluent in vats (gluten settlers). The starch is removed from the tables, for example, by flushing with water, and may be subjected to one or more washing operations usually performed in vacuum or pressure filters of the displacement type. The starch milk made up by combining the three streams from the three separating operations have had, ordinarily, a density at the table heads of between 5° and 7° Baumé.

It has been customary heretofore to use a minor portion of the water from the gluten settlers (gluten water) which liquid contains relatively large quantities of corn solubles, microorganisms and other impurities, for steeping the corn; and to draw off the steep water and evaporate it for the purpose of saving the soluble substances of the corn therein which have considerable value. The amount of gluten water which can thus be used for steeping is limited, for economic reasons, by the cost of evaporation of the steep water, which, if too dilute, will not pay to evaporate. The customary steep water draw-off is about seven gallons per bushel of corn ground—all water computations referred to herein being upon the basis of bushels of corn ground and treated in the process. A larger steep water draw-off would entail a proportionately higher expense for evaporation; and somewhere a point of maximum practical draw-off is reached beyond which the cost of evaporation exceeds the value of the evaporated product.

It has been the practice of late in some starch factories to re-use the rest of the gluten water—the major portion of it—in the wet starch system, that is, in the germ, coarse slop and fine slop separations, in the place of fresh water; and to use in the same operations, as make-up water, wash water or filtrate from the starch washing filters. Such system is disclosed in United States Patent to Rush O. McCoy, No. 1,651,611, patented December 6, 1927.

A system of this character effects complete saving of the corn substance—soluble and insoluble—in the process water, economizes water to some extent and prevents stream pollution, as no process water need be sent into rivers or lakes via the factory sewer; but this re-use of the gluten water in the wet starch system is objectionable because it takes back into the system the relatively large quantities of soluble substances in the gluten water together with micro-organisms and products of micro-organic activity developed in such water in its passage through the various stages of the process and during the period of standing in the gluten settlers; and these nonstarch bodies and substances constitute and give rise to the impurities in the starch, some of which impurities appear to be of a colloidal character difficult to remove by washing. The excess of solubles necessarily increases the difficulties of washing and makes repeated filterings of the starch essential even for a fairly high degree of purity.

In a cyclic system involving repeated return of process waters with draw-off from the system at one or more points, it does not follow that any given volume of process water returned to the system, during a given period of time, will be all drawn off after its passage through the system. On the contrary an indeterminate portion of any given volume of returned process water may be re-circulated, with its solubles, micro-organisms and their products, for an indefinite number of times, and thus a certain number of micro-organisms may remain and thrive in the system for a long period of time; and this condition necessarily brings about an increased quantity in the starch of such impurities as are the result of micro-organic activity or other reactions in the returned gluten water.

The primary object of the present invention is to provide a starch making process whereby all, or substantially all, of the water derived from the starch milk, that is to say, the gluten water, may be returned to the steeps whence it passes through the evaporators without any of it or any substantial quantity of it going to and contaminating the wet starch system. The water necessary for dilution of the material in the separation operation (germ, coarse slop and fine slop) consists in part of water routed from the last of these operations back to prior operations of the series, and in part of the wash water derived from washing the starch with fresh water. The waters thus used back in the separation operation are relatively fresh waters and contain a minimum of soluble substances and micro-organisms.

I do not claim herein the processes described and claimed in application of Frederick L. Jefferies, Serial No. 606,897, filed April 22, 1932 (Patent 2,050,330, August 11, 1936); Serial No. 668,095, filed April 26, 1933; Serial No. 668,097, filed April 26, 1933 (Patent 2,065,313, December 22, 1936); the present process differing in certain respects from the processes of the aforesaid applications, as will be apparent from the following description.

The present invention is illustrated in the accompanying drawing which is a diagrammatic flow sheet of the process in its preferred embodiment.

The invention is not to be regarded, however, as limited to this particular embodiment. The principles of the invention may be applied to systems of quite different character. Nor is the invention limited to the particular apparatuses illustrated diagrammatically in the drawing, the use of particular apparatuses for the different process steps being in many cases optional. The drawing illustrates a water balance based on specific table head densities of from 12° Baumé to 13° Baumé and a specific draw-off of steep water of seven gallons per bushel of corn ground. This water balance is merely typical and would necessarily have to be changed with variations in draw-off, table densities, and other operating conditions.

The numerals on the drawing followed by the abbreviation "Gal." indicate water or water content in terms of bushels of corn ground—the customary way of computing water quantities in wet starch house practice. By "impurities" is intended all non-starch substances in the material, except the germ, gluten and slop (hull, bran and fiber), and the term includes corn solubles and other solubles, micro-organisms, enzymes and their products, and any residual insolubles and colloidal matter in the process waters and in the starch. By the term "starch milk" or the term "mill starch" is intended the mixtures of starch, gluten and water derived from the germ, coarse slop and fine slop, or equivalent separating operations. By "gluten water" is intended the primary process water containing the largest quantities of impurities which is the liquid constituent (including solubles and small quantities of suspended matters) of that portion of the starch milk which is treated for recovery of the starch and gluten. Where reels or shakers are shown and referred to as such, either type of sieving apparatus may be substituted for the other, or other equivalent separating devices may be used. Other methods of separating the gluten from the starch may be used; and if the more usual tabling operation is employed, the starch may be removed from the starch tables by any customary mechanical or manual means instead of by flushing. In short all midifications of the specifically disclosed process, within the scope of the appended claims, are intended to be covered herein. The term "fresh water" is used necessarily in a relative sense: All water contains some solubles and impurities. By "fresh water" is intended either water from service pipes, wells, etc. or process water containing very small quantities of solubles or other impurities in comparison with the quantities of such substances in the material treated by this water.

Referring now to the drawing:

A represents one of the steep tanks of the steeping system, this system consisting ordinarily of a number of tanks in which the corn is steeped with water containing sulphur dioxide at temperatures above room temperature, which vary in different starch factories. The steep water is drawn off to evaporators which are not shown. The steeped corn is broken up in mill B, the germs separated by flotation from the rest of the material in separator C and then washed in the germ washing system D, which latter consists of a series of reels and/or shakers. The degerminated corn is put through a reel E to remove the slop; the liquid magma passing over E is put through a shaker F to remove the grits, i. e. starch particles; and slop and grits are ground in mill G. The ground material is washed in the coarse slop washing system consisting of a series of reels and/or shakers, the drawing showing two reels H, H'. The reels are arranged on the counter-current principle and the bran and fiber are pressed to remove water in the squeezer $H^2$.

The starch milk from the first reel H of the coarse slop wash is passed through a shaker I for removing the finer bran particles which are washed in the fine slop washing system to extract the residual quantities of starch and gluten; the larger quantities of starch and gluten, however, being extracted in the germ separating and washing system and in the coarse slop washing system. The fine slop washing system consists, as shown in the drawing, of a shaker J and reels K and L, all arranged on the counter-current principle. M is a press for pressing out the water from the fine slop.

The starch milk from the shaker F (germ separating and washing system), which, ordinarily contains the largest amount of solids, soluble and insoluble, that is to say, the starch milk stream of the greatest density is combined with the starch milk stream from the shaker I (coarse slop washing system), which, under ordinary conditions, will contain smaller quantities of solids, soluble and insoluble, and the combined streams are subjected to any suitable treatment for removing the gluten from the starch. For example, to follow current practice, the starch milk from the germ and coarse slop systems is passed over starch tables O, the starch settling on the tables and the gluten and major portion of the water tailing off into the gluten settlers P. Ordinarily starch milk has been tabled at densities of between 5° and 7° Baumé. These are the usual tabling densities (which, of course, differ somewhat in different factories) where, as has been heretofore customary, the starch milk stream from the fine slop wash, which contains a relatively small quantity of solids, soluble and insoluble, is combined with the streams from the germ and coarse slop systems, that is, where all of the starch milk extracted by the germ, coarse slop and fine slop separating operations is sent to the starch tables. By tabling only the streams from the germ and coarse slop systems the table head densities will, of course, be considerably higher than has been customary heretofore. The densities may run as high as 12° or 13° Baumé. But it has been found possible to make a satisfactory separation as between starch and gluten with the table densities as high as indicated by increasing somewhat the pitch of the tables and decreasing the rate of flow of the liquid over the tables as described in the aforementioned Jefferies' application, Serial No. 668,095 and in a division thereof Serial No. 757,179, filed December 12, 1934.

The gluten from the tables is settled in the settlers P and the water pressed from the gluten in the presses Q. The starch is then flushed, or otherwise removed from the starch tables, and is subjected to washing operations, with fresh water, in the starch washing filters R and S; the starch from filter R being diluted in the tank T and then run into the second filter S.

The low density starch milk from the shaker J (fine slop washing system) is routed back to the separating operation or operations preceding the fine slop washing operation, which, because of this expedient, will require less water from other sources in order to maintain the usual dilutions. That is, if fresh water is used in the germ and coarse slop systems, less fresh water will be needed if the expedient is practiced of routing the fine slop starch milk back to the germ and coarse slop systems, as provided by this invention. The fine slop starch milk is perhaps less efficient because of its content of solids than fresh water as a washing or separating fluid, but this deficiency may be compensated, if necessary, by using a somewhat larger quantity of the dilute starch milk. If, as in the usual "bottled-up system" the germ and coarse slop systems are supplied with gluten water, i. e. water from the gluten settlers, as a washing medium, it is possible, if the practice of the present invention is followed, to have the dilute starch milk from the fine slop wash displace entirely the gluten water heretofore used in the germ and coarse slop systems and to thereby obtain a much purer starch; or to use such a small amount of gluten water back in the system as to reduce contamination from this source to an inappreciable minimum. That is, with the starch milk from the fine slop wash routed back to the preceding steps of the process, and with the tabling only of the high density starch milk streams from the germ and coarse slop systems, the amount of gluten water will be reduced, due to the higher tabling density, to such a point that all, or practically all, of the gluten water may be returned to the steeping system, while at the same time, the usual dilutions in the germ and coarse slop washing systems are maintained through the re-routing to such systems of the fine slop starch milk. A slight excess, if any, of gluten water may be sent to the sewer without appreciable loss.

It will be understood that it may be necessary in some factories to re-adjust the quantities of starch milk tabled and routed back to the process. For example, if necessary to maintain the proper dilution in the early stages of the process, some of the starch milk from the coarse slop system (the density of which is ordinarily lower than that of the starch milk from the germ system) may be routed back to the process with the starch milk from the fine slop system; or under other operating conditions some of the fine slop starch milk may have to be diverted to and combined with the starch milk streams going over the tables in order to maintain desirable water contents in different parts of the process.

The connections between the apparatuses above referred to, (connections will be referred to as pipes, although any suitable conduits or conveyors may be employed) will be designated in connection with the detailed description of the operation of the process which follows:

*Operation.*—Corn containing, for example, 1.2 gallons of water per bushel enters the steeping system A at 10, and the steep water, 7 gallons in amount, is withdrawn from the steeping system at 11 and sent to the evaporators. The steeped corn containing 5.4 gallons of water passes through pipe 12 to the mill B, and the coarsely ground material from the mill through pipe 13 to the separator C. The germs floated in the separator C are discharged to the germ wash D through pipe 14, the resultant starch milk being returned to the separator C through pipe 15 in order to maintain a proper gravity in the separator. The washed germs containing 0.5 gallon of water are discharged from the system at 16.

The degerminated corn passes through pipe 17 to the reel E, and from reel E the slop goes through pipe 18 to the mill G. The liquid substance from reel E passes through pipe 19 to shaker F from which the grits tail off and pass through pipe 20 to mill G. The starch milk from shaker F passes through pipe $x$ to the tables O. The material finely ground in mill G passes through pipe 21 to the first reel H of the coarse slop washing system. The tailings from reel H pass through pipe 22 to reel $H^1$ and the tailings from reel $H^1$ through pipe 23 to the squeezer $H^2$. The coarse slop is discharged from the squeezer, with 0.6 gallon of water, at 24. Water from the squeezer passes back to reel $H^1$ through pipe 25, and starch milk from reel $H^1$ passes to reel H through pipe 26. The number of units (reels and/or shakers) in the coarse slop washing system may and ordinarily will be greater than shown in the drawing. The starch milk from the reel H of the coarse slop washing system passes through pipe 27 to the shaker I, and then through pipe $y$ to the tables O. As the streams $x$ and $y$ are of different densities, they should be thoroughly mixed, by any suitable means (not shown), before being delivered to the starch tables.

The fine slop tailing off from the shaker I and containing 5.6 gallons of water passes through the pipe 28 to the fine slop wash, going first over the shaker J, then by pipe 29 to the reel K, and by pipe 30 to the reel L. The tailings from reel L pass through pipe 31 to the press M from which the fine slop is discharged at 32, containing 0.3 gallon of water. The water from press M passes through pipe 33 to reel L, and the starch milk from reel L passes through pipe 34 to reel K. The starch milk from reel K passes through pipe 35 to the shaker J.

The starch milk from the fine slop wash leaves shaker J through pipe $z$ and is distributed as may be required to the germ wash and coarse slop wash; as large an amount as possible being sent to the germ wash, preferably because, as this liquor is a relatively heavy liquor, it should be routed back, to the greatest extent possible, to the head end of the system. The slight increase in gravity in the separators which would occur because of the content of insoluble solids in the fine slop starch milk returned to the separating system may be compensated for by increasing, if need be, the amount of water flowing through pipe 17. In the water balance arrangement disclosed in the drawing herein, 8.6 gallons of the $z$ stream from the fine slop go to the germ wash D, the balance, 5.0 gallons, passing through pipe 36 to reel H of the coarse slop system where it mingles with the starch milk entering reel H through pipe 26, and with the finely ground material from pipe 21 leading from the mill G. That is, the portion of the fine slop starch milk which is returned to the coarse slop system is preferably sent to the head end of that system, because of its content of insoluble solids so that these solids can pass through all of the screening devices of the coarse slop wash to insure maximum removal of starch and gluten by this wash.

The gluten and water from the starch tables pass through pipe 37 to the gluten settlers P. The settled gluten passes through pipe 38 to the presses Q from which the gluten, containing 0.9 gallon of water, is discharged at 39, the water from the press going back to the gluten settlers through pipe 35.

The starch is removed from the tables O either manually or by mechanical means, or preferably, as shown, by flushing. The flushed starch, containing 8.9 gallons of water, passes through pipe 40 to the first filter R. In this filter the starch is first de-watered and is then washed with fresh water, 2.8 gallons of which enter the first filter from the fresh water supply pipe 41. The washed starch is discharged through pipe 42 to the dilution tank T where it is diluted with 5.6 gallons of fresh water through the branch pipe 43. The diluted starch passes from tank T through pipe 44 to the second filter S where it is first de-watered and then washed with 2.8 gallons of fresh water introduced through branch pipe 45. The fresh water supply totals 11.2 gallons. The washed starch is discharged from the filter S at 46 and contains 3.1 gallons of water.

The gluten water from settlers P passes through the pipe 47 to the steeping system. The amount is 11.2 gallons, some of which is absorbed in the corn, and the balance, 7.0 gallons, is withdrawn from the system as steep water for evaporation. Of the 8.6 gallons of filtrate from the filter R, 3.1 gallons goes through pipe 48 to reel H¹ of the coarse slop system and 5.5 gallons through pipe 49 to the reel L of the fine slop wash. Of the 8.4 gallons of filtrate from the filter S, 5.6 gallons goes through pipe 50 to the starch tables for flushing the starch therefrom and 2.8 gallons through pipe 51 to the reel L of the fine slop wash.

I claim:

1. Process of obtaining starch from corn by the wet method in which substantially all process waters, except steep water and water absorbed in the discharged solids, are reused in the process and which comprises: steeping the corn; comminuting the steeped corn; subjecting the comminuted corn to germ, coarse slop and fine slop washes, yielding high gravity mill starch from the germ and coarse slop washes and low gravity mill starch from the fine slop wash; reusing the fine slop starch milk, without removal of the solids therefrom in preceding steps of the process subsequent to steeping; separating the gluten and most of the water from the high gravity starch milk derived from the germ and coarse slop washes; and reusing substantially all of the resultant gluten water for steeping corn as the process is continued.

2. Process of obtaining starch from corn by the wet method in which substantially all process waters, except steep water and water absorbed in the discharged solids, are reused in the process and which comprises: steeping the corn; comminuting the steeped corn; subjecting the comminuted corn to germ, coarse slop and fine slop washes, yielding starch milk having a gravity in the neighborhood of 12°–13° Baumé from the germ and coarse slop washes and a low gravity mill starch from the fine slop wash; reusing the fine slop starch milk, without removal of the solids therefrom, in the preceding steps of the process subsequent to steeping; tabling the mill starch from the germ and coarse slop washes at the gravity as aforesaid; removing the gluten from the effluent from the tabling operation by a gravity settling operation; and reusing substantially all of the gluten settler water for steeping corn as the process is continued.

3. Process of obtaining starch from corn by the wet method in which substantially all process waters except steep water and water absorbed in the discharged solids are reused in the process and which comprises: steeping the corn; comminuting the steeped corn; subjecting the comminuted corn to germ, coarse slop and fine slop washing operations, yielding high gravity mill starch from the germ and coarse slop washes and low gravity mill starch from the fine slop wash, said coarse slop washing operation being performed in a series of consecutive washing steps; reusing the fine slop starch milk, without removal of the solids therefrom, in part in the germ wash and the rest in the coarse slop wash, introducing this mill starch into the first washing step of the coarse slop washing operation; separating the gluten and most of the water from the high gravity starch milk from the germ and coarse slop washes; and reusing substantially all of the resultant gluten water for steeping corn as the process is continued.

WILLIAM B. NEWKIRK.